US 6,697,054 B1

(12) United States Patent
Kamizono

(10) Patent No.: US 6,697,054 B1
(45) Date of Patent: Feb. 24, 2004

(54) KEYBOARD DEVICE CAPABLE OF AUTOMATICALLY CHANGING FUNCTION OF CERTAIN KEY WITHOUT PRESSING A SPECIFIC KEY

(75) Inventor: Hidenobu Kamizono, Tokyo (JP)

(73) Assignee: NEC Corporation, Tokyo (JP)

( * ) Notice: Subject to any disclaimer, the term of this patent is extended or adjusted under 35 U.S.C. 154(b) by 151 days.

(21) Appl. No.: 09/599,569

(22) Filed: Jun. 23, 2000

(30) Foreign Application Priority Data

Jun. 23, 1999 (JP) .......................................... 11-176226

(51) Int. Cl.⁷ ................................................ G09G 5/00
(52) U.S. Cl. ......................... 345/168; 341/22; 400/477
(58) Field of Search ............................... 345/158, 156, 345/157, 168, 169, 170, 172, 173; 341/20–22, 26–34; 400/472, 476, 477

(56) References Cited

U.S. PATENT DOCUMENTS

| 5,245,321 A | * | 9/1993 | Franz et al. ................ 345/172 |
| 5,646,648 A | * | 7/1997 | Bertram ..................... 345/168 |
| 5,675,361 A | * | 10/1997 | Santilli ....................... 345/168 |
| 5,707,160 A | * | 1/1998 | Bowen ....................... 400/472 |
| 5,864,334 A | * | 1/1999 | Sellers ....................... 345/168 |
| 5,909,210 A | * | 6/1999 | Knox et al. ................. 345/168 |
| 6,046,728 A | * | 4/2000 | Hume et al. ................ 345/157 |
| 6,198,474 B1 | * | 3/2001 | Roylance .................... 345/168 |
| 6,396,483 B1 | * | 5/2002 | Hiller ......................... 345/173 |

FOREIGN PATENT DOCUMENTS

| JP | 59-151328 U | 10/1984 |
| JP | 4-354012 A | 12/1992 |
| JP | 10-260763 | * 9/1998 |

* cited by examiner

Primary Examiner—Amr Ahmid Awad
(74) Attorney, Agent, or Firm—Sughrue Mion, PLLC

(57) ABSTRACT

A keyboard device includes a sensor (1) for detecting whether hands of a user are present at the home position, a function switching key to select one of the two functions by pressing a key (2), a sensor validating/invalidating switch (3) to changeover the validation/invalidation of the detection result of the sensor, and a microcomputer 6 for selecting the function according to the detection result of the sensor (1) when the sensor validating/invalidating switch (3) is validated, and by the function switching key when the same is invalidated.

3 Claims, 7 Drawing Sheets

KEYBOARD DEVICE CAPABLE OF AUTOMATICALLY CHANGING FUNCTION OF CERTAIN KEY WITHOUT PRESSING A SPECIFIC KEY

BACKGROUND OF THE INVENTION

The present invention relates to a keyboard device which is used for information processing apparatus or the like, and particularly to a keyboard device for changing over two functions affected by certain keys of a keyboard, or changing over validation/invalidation of the input of certain keys.

Conventionally, keyboards used for information processing apparatus are required to dispose efficiently necessary keys in a limited space, or to prevent miss operation of key inputting. For this effect, in certain keyboard devices, a key is eliminated by replacing the function of that key with simultaneous press of a plurality of another keys, or a same key is used for several functions by changing over bra select key, as described in an unexamined Japanese Utility Model Publication No. SHO 59-151328, namely 151328/1984.

On the other hand, an unexamined Japanese Patent Publication No. HEI 04-354012, namely 354012/1992, discloses a keyboard device for changing over the key arrangement by a switching key, wherein a combined input of a plurality of desired key invalidates input from the switching key, and thereafter, even when the switching key is pressed in the following input, the input will be cancelled in order to avoid miss input.

In the prior art mentioned above, the function changeover of certain keys is performed by pressing the switching key, and the cancellation of this switching key is also executed by the combined input of a plurality of keys.

SUMMARY OF THE INVENTION

It is therefore an object of the present invention to perform automatically the function changeover of certain key, valid/invalid setting of switching key, prevention of miss input of certain keys, or the like, without pressing a specific key.

Other objects of the present invention will become clear as the description proceeds.

According to an aspect of the present invention, there is provided a keyboard device for key inputting by selecting any one of two functions affected by certain keys on a keyboard, wherein whether hands of a user are present at the home position is detected by a sensor, and one of the two functions affected by the certain keys is selected based on the result of the detection by the sensor.

The certain keys may be ten-key section provided with numeric input function and cursor shift function.

According to another aspect of the present invention, there is provided a keyboard device for key inputting by selecting any one of two functions affected by certain keys on a keyboard, comprising: a sensor for detecting whether hands of a user are present at the home position; a function switching key to select one of the two functions by pressing a key; a sensor validating/invalidating switch to changeover the validationl invalidation of the detection result of the sensor; and a control section for selecting the function according to the detection result of the sensor when the sensor validating/invalidating switch is validated, and by the function switching key when the same is invalidated.

The certain keys may be ten-key section provided with numeric input function and cursor shift function.

According to yet another aspect of the present invention, there is provided a keyboard device for key inputting by selecting any one of two functions affected by certain keys on a keyboard, comprising: a function switching key to changeover the function to be selected each time when it is pressed down; a sensor, which is active (ON state) when hands of a user are present at the home position and inactive (OFF state) when they are not at the home position; and a control section for monitoring respective events of pressdown of the function switching key, transitions from ON state to OFF state of the sensor and from OFF state to ON state of the sensor, and selecting alternatively the two functions, each time when one of events occurs.

The certain keys may be ten-key section provided with numeric input function and cursor shift function.

According to still another aspect of the present invention, there is provided a keyboard device, comprising: a first group of keys provide on a keyboard; a sensor for detecting whether hands of a user are present at the home position of this first group of keys; a second group of keys provided on this side opposite to the first group of keys taking the sensor as border; and a control section for monitoring the detection result of the sensor and disabling the input by the second group of keys while the sensor detect hands.

The second group of keys may include at least one of a group of numeric input keys and a group of cursor shift keys.

According to further another aspect of the present invention, there is provided a keyboard device, comprising: a first group of keys provide on a keyboard; a left hand sensor for detecting whether the left hand of a user is present at the left hand home position of the first group of keys; a right hand sensor for detecting whether the right hand of a user is present at the right hand home position; a second group of keys provided on this side left opposite to the first group of keys taking the left hand sensor as border; a third group of keys provided on this side right opposite to the first group of keys taking the right hand sensor as border; and a control section for monitoring the detection result of the left hand sensor and the right hand sensor and disabling the input by the second group of keys while the left hand sensor detect the hand and disabling the input by the third group of keys while the right hand sensor detect the hand.

The second or third group of keys may be group of numeric input keys.

The second or third group of keys may be group of cursor shift keys.

DETAILED DESCRIPTION OF THE PREFERRED EMBODIMENTS

Figure 1:
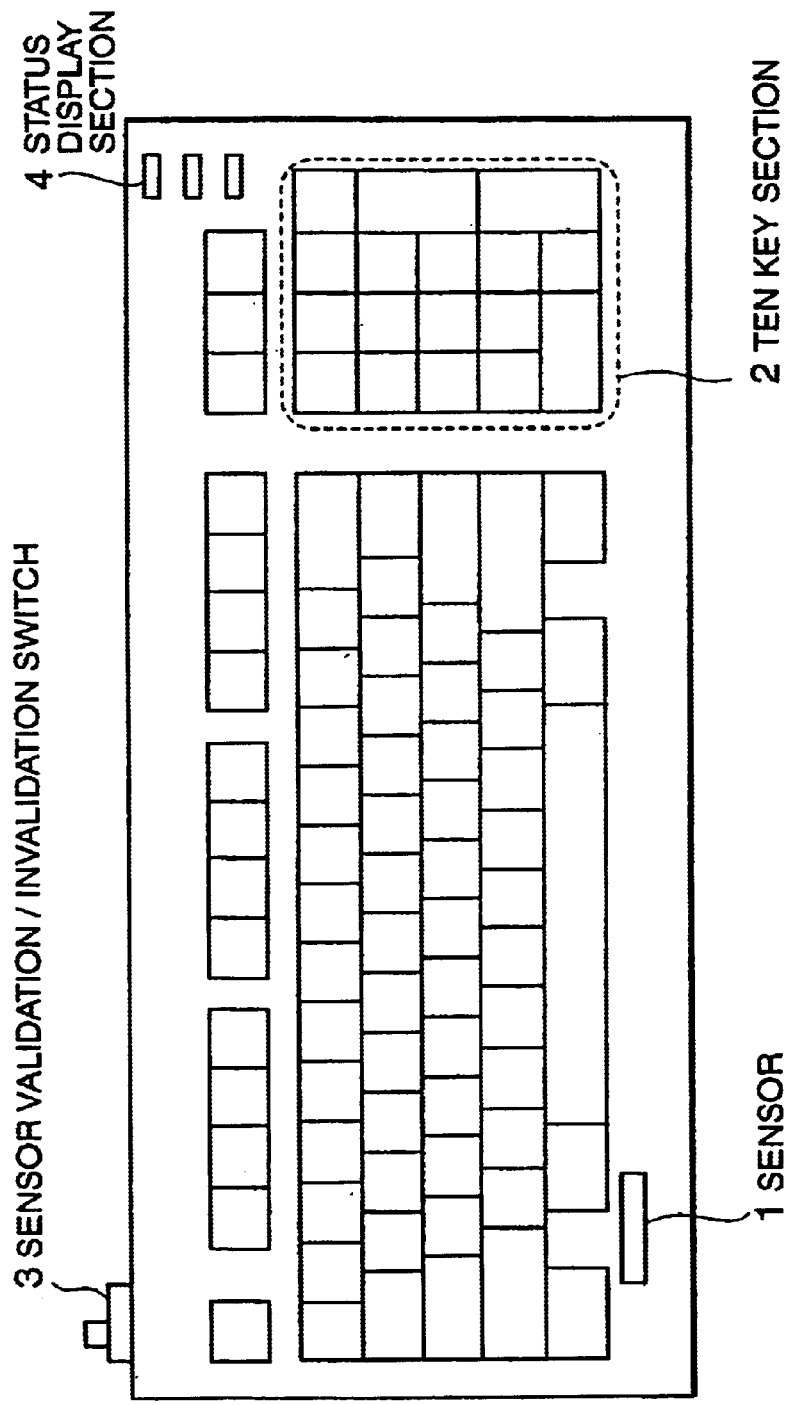
FIG. 1 shows an example of arrangement on the keyboard of respective components in the first embodiment of the present invention.
Figure 2:
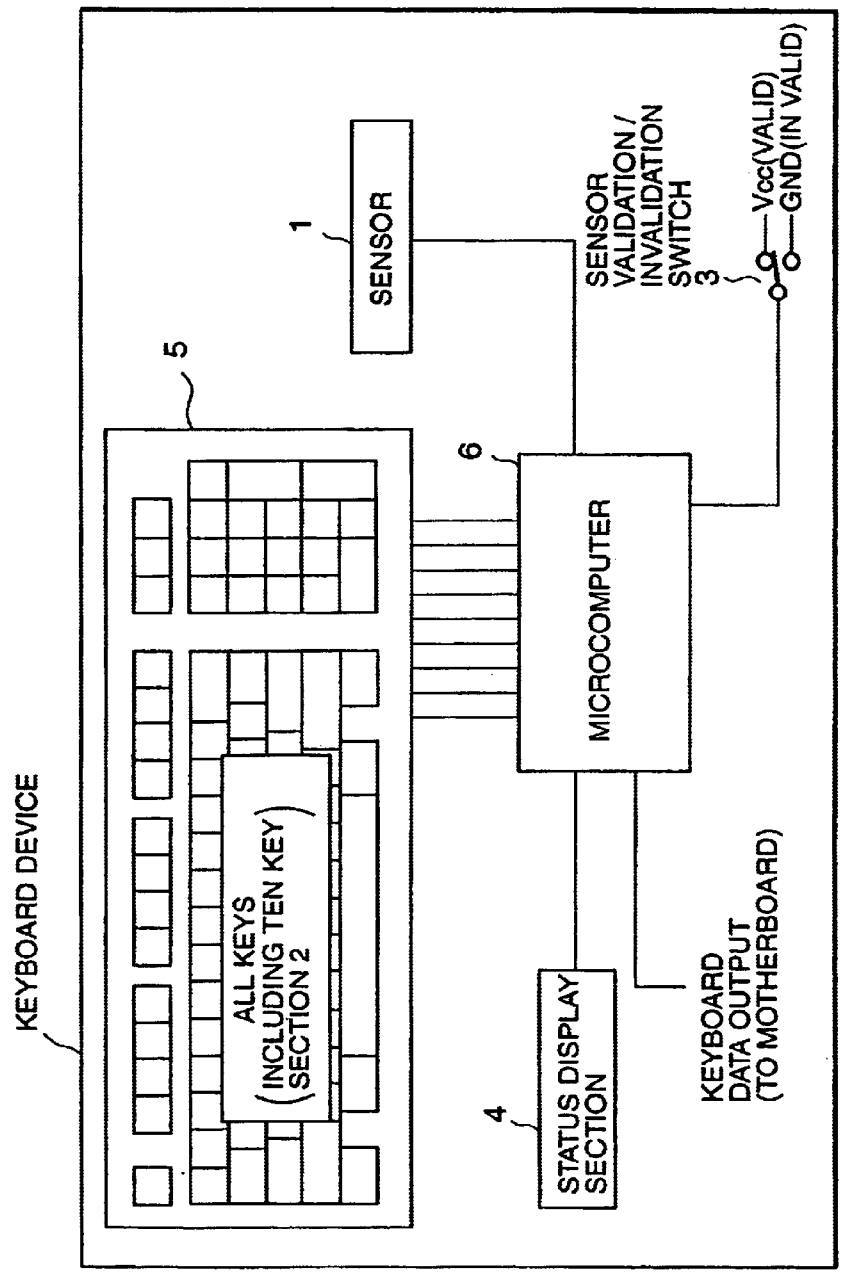
FIG. 2 is a block diagram showing the composition of the first embodiment of the present invention.
Figure 3:
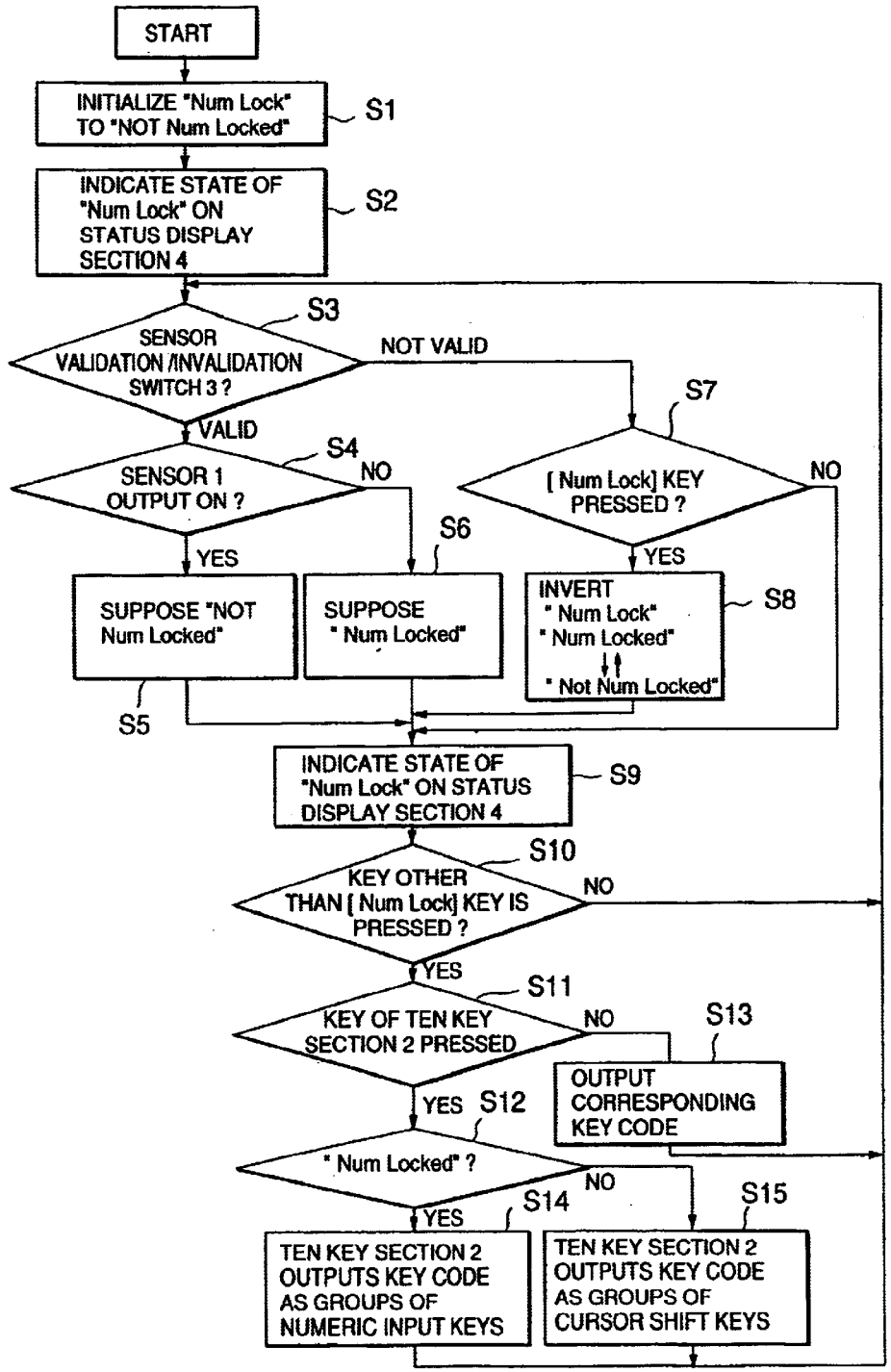
FIG. 3 is a flowchart showing the operation of the first embodiment of the present invention.

Referring now to FIGS. 1 through 3, description will be made as regards a keyboard device according to a first embodiment of the present invention.

FIG. 1 shows an example of arrangement of each component on a keyboard according to the first embodiment of the present invention. In this embodiment, a ten key section 2 is supposed to have two functions of group of numeric input keys and group of cursor shift keys, and the operation to validate one of these functions and invalidate the other function will be described.

In FIG. 1, a sensor 1 is disposed at a position in contact with or covered by the left hand when the left hand is put on the home position (home position is a state where the left index rests on the key [F] and the right index on the key [J] during the key input), detects a human hand on the sensor by, for instance, detecting infrared light, and changes to ON state upon its detection. Here, this sensor may well be any sensor provided that it detect the contact of the hand with the sensor or the proximity of the hand around the sensor, and it may be another sensor, for example, a contact sensor put ON upon detection of the hand, or a temperature detection sensor or the like, put ON upon detection of a predetermined ambient temperature.

A ten key section is equivalent to a ten key section including keyboard for personal computer or the like, and the key signification changes according to the state of "NumLock". Here, it shall be described as group of numeric input keys if "NumLocked", or as group of cursor shift keys if "non" "Numlocked", however it may well be inverted.

The sensor validation/invalidation switch 3 is a switch to select the use of the output from the sensor 1 or the use of "NumLock" key (not shown) on the keyboard to change the state of "NumLock" of the ten key section 2. When the "sensor is valid", the state of "NumLock" of the ten key section 2 depends only on the output of the sensor 1, and when the "sensor is not valid", the state of "NumLock" will change only by pressing down the "NumLock" key (not shown) on the keyboard.

The status display section 4 indicates the state of "NumLock" of the ten key section 2 for informing the user of the actual state by, for example, turning on when "NumLocked", and blinking when "not Numlocked" or by other states.

FIG. 2 is a block diagram showing the composition of the first embodiment of the present invention.

The microcomputer 6 judges the actual state of "NumLock" of the ten key section 2 from the whole keys 5, the sensor 1 and the sensor validation/invalidation switch 3 to indicate it on the status display section 4, and also, converts according to the state of "NumLock" with its inner key code table, and transmits the key code to the motherboard. Now, if a key other than the ten key section 2 is input, the function of respective keys rests invariable independent of the state of the sensor 1 or the NumLock key (not shown) and the function is completely identical to a convention keyboard. Here, it will be described supposing that the sensor validation/invalidation switch 3 is not valid when it is connected to the GRD (ground) side, and valid when it is connected to the voltage Vcc side.

Next, the operation of the first embodiment of the present invention will be described in detail referring to FIG. 3. FIG. 3 is a flow-chart showing the operation of the first embodiment of the present invention.

First, when the power supply of the keyboard is turned on, the microcomputer 6 initializes the state of "NumLock" of the ten key section 2 to "not NumLocked" state (step S1).

Given the "not NumLocked" state, the microcomputer 6 informs the user of the "not NumLocked" state, namely, that the ten-key section 2 can be used as group of cursor shift keys, by blinking the status display section 4 (step S2).

Next, the microcomputer 6 detects if the sensor validation/invalidation switch 3 is connected to the voltage Vcc side (valid) or is connected to the GRD side (not valid) (step S3).

According to the detection result of the step S3, if the sensor validation/invalidation switch 3 is valid, the microcomputer 6 detects if the output of the sensor 1 is ON or OFF (step S4).

Upon the detection result of the step 84, if the output of the sensor 1 is ON, namely if the hand is in contact with the sensor or in the proximity of the sensor, the microcomputer 6 judged that the state is "not NumLocked". This is the state where the key is operated with the left hand on the home position (step S5).

Upon the detection result of the step S4, if the output of the sensor 1 is OFF, namely if the left hand is displaced beyond the detection range by the sensor 1, the microcomputer 6 judged that the state is "NumLocked". (step S6).

In the step S3, if the sensor validation/invalidation switch 3 is not valid, the microcomputer 6 detects if the "NumLock" key (not shown) on the keyboard is pressed down (step S7) and judged that the state is "NumLocked" if it is pressed down. Thereafter, while the sensor validation/invalidation switch 3 is not valid, two states of "not NumLocked" and "NumLocked" are to be inverted alternatively (step S8).

After "NO" of the steps S5, S6, S7 and S8, the microcomputer 6 indicates the state of "NumLock" in the respective step on the status display section 4. For example, in the step S5, as the state is "not NumLocked", the status display section 4 blinks, while in the step 6, as the state is "NumLocked", the status display section 4 will be turned on, to inform the user of the present state (step S9).

Next, the microcomputer 6 detects if a key other than NumLock key (not shown) on the keyboard is pressed, and proceeds to the step S11 if it is pressed, and returns to the step S3 if it is not pressed. Here, it is detected if a key other than NumLock key is pressed, because it is unnecessary to transmit the key code to the motherboard, even if NumLock key is pressed (step S10).

In the step S10, if a key other than NumLock key is pressed, the microcomputer 6 detects, uninterruptedly, if a key of the ten key section 2 is pressed (step S11).

Then, upon the detection of the depression of a key of the ten key section 2, the microcomputer 6 judges if the state of "NumLock" of the ten key section 2 is "NumLocked" state or "not NumLocked" state according to one of states of the steps S5 to S8, and proceeds to the next step S14 or step S15 (step S12).

In the step S11, if a key of the ten key section 2 is not pressed, namely, a key other than the one of the ten key section 2 is pressed, the microcomputer 6 outputs the key code corresponding to this pressed key to the motherboard, independent of the state of "NumLock" (step S13).

In the step S12, if the state is "NumLocked", the microcomputer 6 performs the conversion according to the "NumLocked" state with its inner key code table, and transmits the key code as numeric input key to the motherboard (step S14).

In the step S12, if the state is "not NumLocked", the microcomputer 6 performs the conversion according to the "not NumLocked" state with its inner key code table, and transmits the key code as cursor shift key to the motherboard (step S15).

After the state S10, S13, S14 or S15, it returns to the step S3, to repeat the operation mentioned above.

As described herein before, according to this embodiment, it is possible to change over the ten key section 2 automatically to one of group of numeric input keys or group of cursor shift keys according to the output ON/OFF of the sensor 1 for detecting the presence of user's left hand.

Note that, in the embodiment, the sensor validation/invalidation switch 3 and NumLock key may both be eliminated, and the changeover of two functions may well be performed always by the sensor 1.

Figure 4:
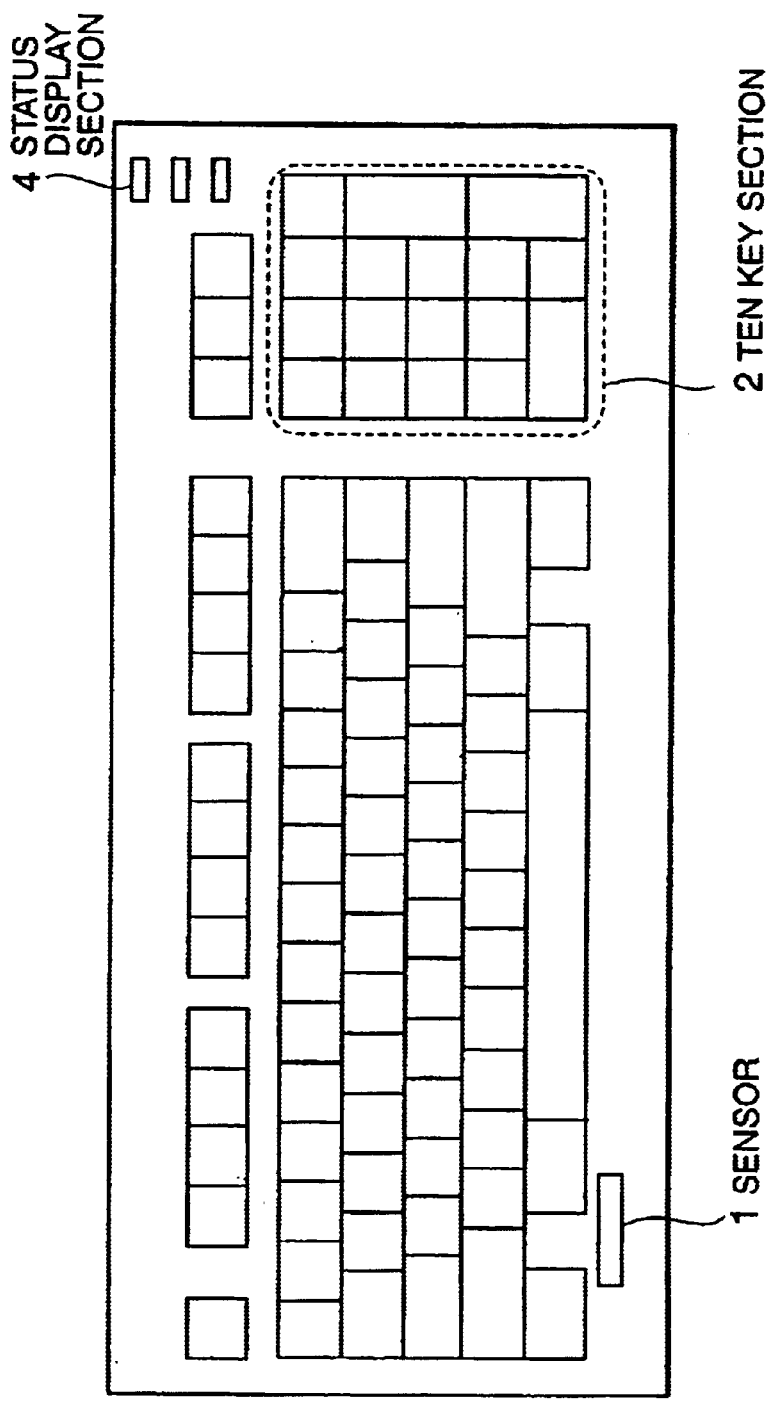
FIG. 4 shows an example of arrangement on the keyboard of respective components in the second embodiment of the present invention.

Next, a second embodiment of the present invention will be described referring to drawings. FIG. 4 shows an example of arrangement of each component on a keyboard according to the second embodiment of the present invention and FIG. 5 is a block diagram showing the composition of the second embodiment of the present invention.

In the first embodiment of the present invention mentioned above, when the sensor validationl invalidation switch is not valid, the state of "NumLock" changes only by pressing down the "NumLock" key, and when the sensor validation/invalidation switch is valid, the state of "NumLock" changes only by the output of the sensor.

Figure 5:
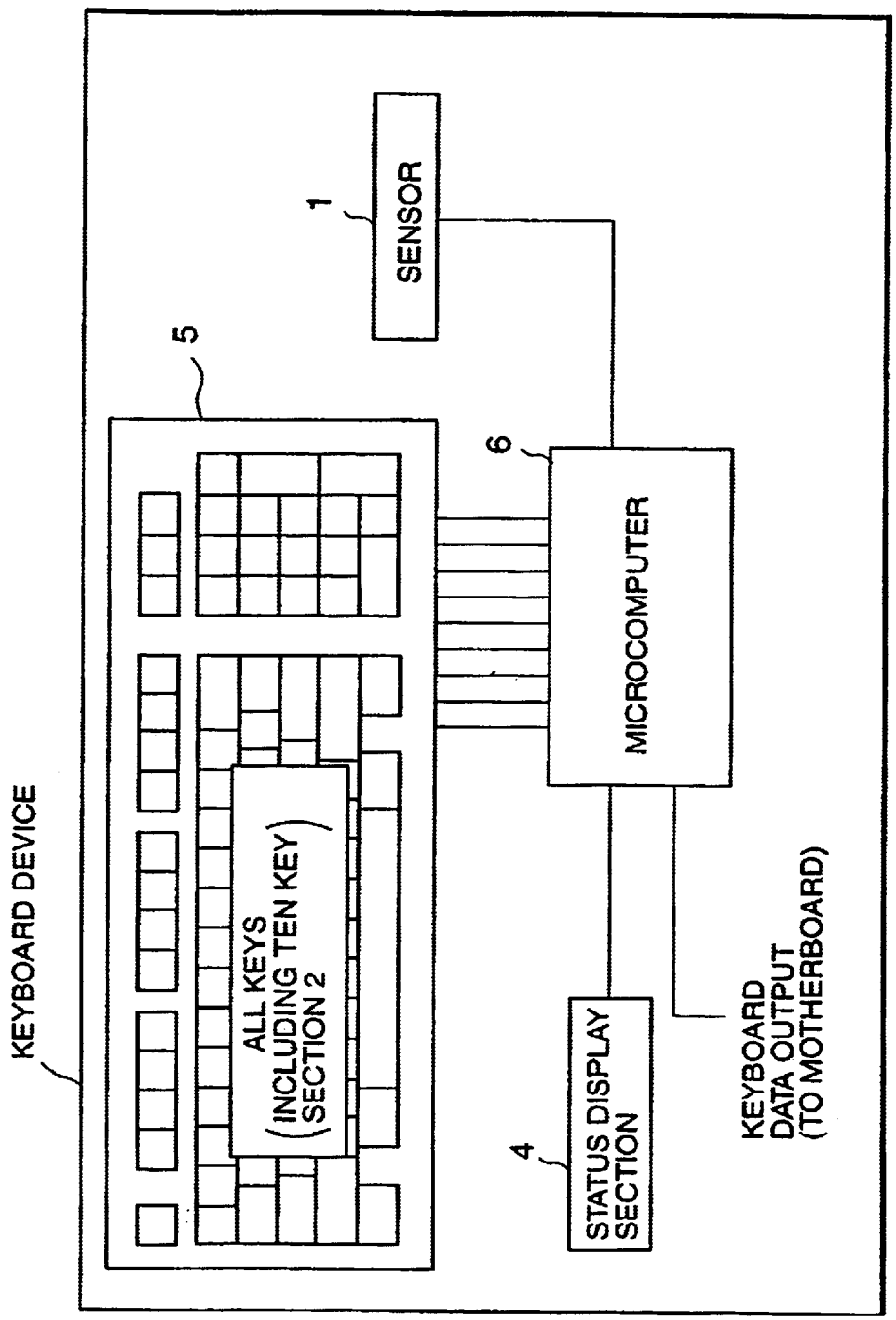
FIG. 5 is a block diagram showing the composition of the second embodiment of the present invention.

As shown in FIG. 4 and FIG. 5, in the second embodiment of the present invention, the sensor validation/invalidation switch 3 is eliminated from the composition of the first embodiment of the present invention, as shown in FIG. 4 and FIG. 5. Also, it is different in that the state of "NumLock" can be changed either by the output of the sensor 1 or by pressing down the "NumLock" key. In other words, the state of "NumLock" can be changed alternatively by the occurrence of respective event of sensor ON, sensor OFF and "NumLock" key pressed down.

Figure 6:
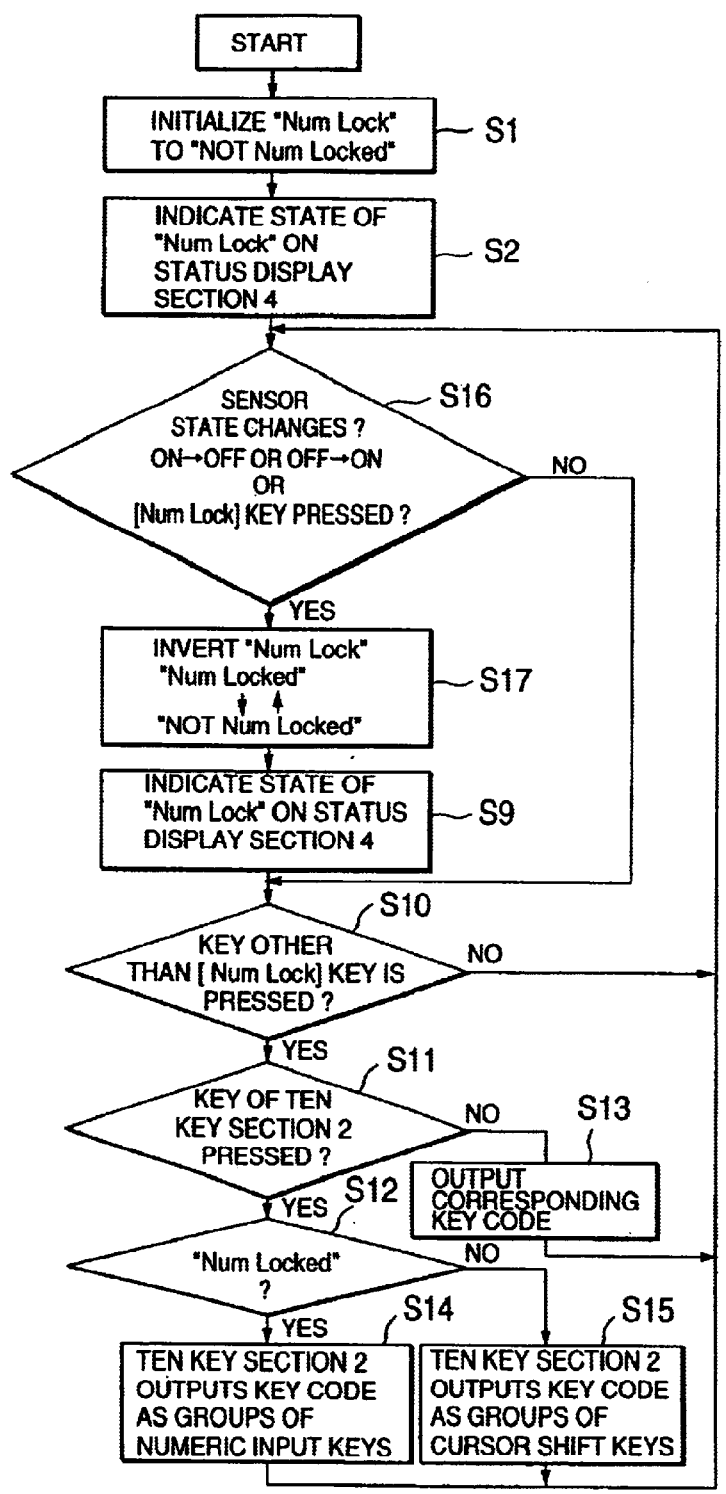
FIG. 6 is a flowchart showing the operation of the second embodiment of the present invention.

The operation of this second embodiment of the present invention will be described in detail referring to FIG. 6. Compared to FIG. 3, flow-chart showing the operation of the first embodiment of the present invention, steps S3 to S8 of FIG. 3 are replaced with steps S16 and S17, so steps S16, S17 will be described below.

The microcomputer 6 detects the occurrence of either of events including ON state→OFF state of the sensor, OFF state →ON state of the sensor, by means of a signal from the sensor 1 and "NumLock" key.

If the occurrence of one of events is detected in the step S6, "NumLock" state will be changed. For example, if the state before the occurrence of event is "not NumLocked", it is changed to "NumLocked" state, and if the state before the occurrence of event is "NumLocked", it is changed to "not NumLocked" state (step S17).

If none of event has occurred in the step 16, it proceeds to the step S10.

As described herein before, in this embodiment of the present invention, as the sensor valitialion/invalidation switch 3 is eliminated, the state of "NumLock" can be changed alternatively at each occurrence of any one event, by monitoring always the occurrence of respective events including ON state→OFF state of the sensor, OFF state→On state of the sensor, or depression of "NumLock" key.

In the first or second embodiment of the present invention described herein before, the ten key section is provided with two functions of numeric input and cursor shift, that are changed over according to the sensor output; however, it is obvious that the present invention is not limited to this, but can be applied to a group of key having other functions. Also, it may well be applied to a single key provided with two functions, in place of a group of keys such as ten key section.

Next, a third embodiment of the present invention will be described referring to drawings. FIG. 2 is a diagram showing the composition of the third embodiment of the present invention, and in this example, keys are arranged in a portion that is usually used as palm rest.

Figure 7:
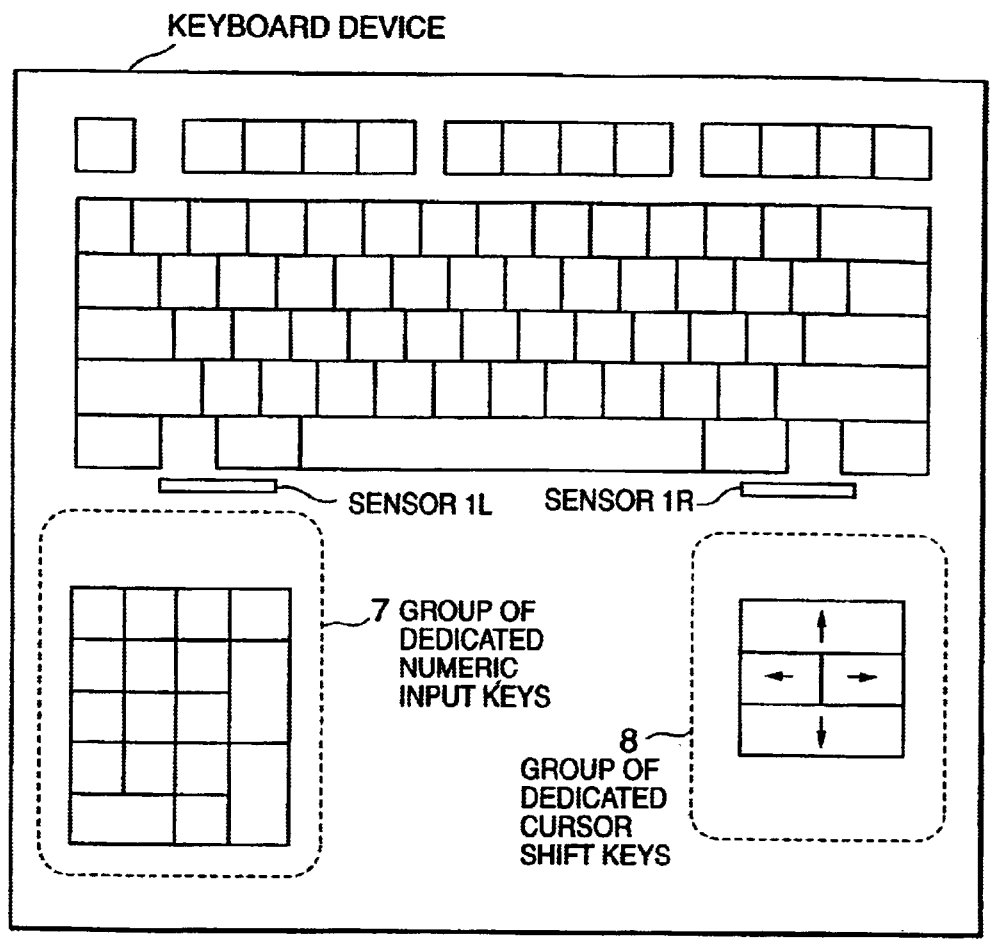
FIG. 7 shows the composition of the third embodiment of the present invention.

In FIG. 7, a sensor 1 L and a sensor 1 R are disposed at the position to be in contact with or covered by the left hand or he right hand respectively, when both hands are put on the home position, and similarly to the first or second embodiment of the present invention, these sensors detect the human hand over the sensor by detecting infrared beam and turn ON upon the detection.

A group of dedicated numeric input keys 7 and a group of dedicated cursor shift keys 8 are disposed by dividing separately a group of numeric input keys and a group of cursor shift keys =provided with the ten key section of FIG. 1 or FIG. 4.

A microcomputer not shown inside the keyboard device makes the sensor 1 L correspond to the group of dedicated numeric input keys 7 and the sensor 1 R to the group of dedicated cursor shift keys 8 respectively, and controls to cancel the group of dedicated numeric input keys 7 when the sensor 1 L is On and to cancel the group of dedicated cursor shift keys 8 when the sensor 1 R is ON.

Now, the operation of the third embodiment of the present invention will be described referring to FIG. 7.

First, when the user puts their hands on the home position, the sensor 1 L and the sensor 1 R detect respectively the presence of left hand and right hand respectively and turn ON.

The microcomputer in the keyboard device cancels the group of dedicated numeric input keys 7 when the sensor 1 L is On and. cancels the group of dedicated cursor shift keys 8 when the sensor 1 R is ON. Consequently, the group of dedicated numeric input keys 7 and the group of dedicated cursor shift keys 8 are both cancelled, whereby, the key input will not be performed event when the group of dedicated numeric input keys 7 or the group of dedicated cursor shift keys 8 are pressed by mistake, during other key input.

Next, if it is desired to operate the group of dedicated cursor shift keys 8, the right hand is detached from the home position, to turn OFF the sensor 1 R. The microcomputer detects that the sensor 1 R is turned OFF, and validates the corresponding group of dedicated cursor shift keys 8. Then, in this state, if the group of dedicated cursor shift keys 8 is operated, their input is taken as valid, and the microcomputer outputs a key code as key for cursor shift to the motherboard.

If the group of dedicated numeric input keys 7 is to be operated, the left hand is detached from the home position, to turn OFF the sensor 1 L. The microcomputer detects that the sensor 1 L is turned OFF, and validates the corresponding group of dedicated numeric input keys 7. Then, in this state, if the group of dedicated numeric input keys 7 is operated, their input is taken as valid, and the microcomputer outputs a key code as key for numeric input to the motherboard. Here, the group of dedicated numeric input keys 7 may be operated by the right hand, provided that the left hand is out of the home position.

As described hereinbefore, according to this embodiment, keys can be arranged in a portion that is usually used as palm rest and where, conventionally, keys were not arranged in order to avoid miss input by accidental press by the hand, because a key or a group of keys arranged in this side of the sensor is invalidated when a hand is in the proximity of the sensor.

In the third embodiment of the present invention described herein before, it is controlled to validate or invalidate, the group of dedicated numeric input keys 7 or the group of dedicated cursor shift keys 8, respectively by the output of the sensor 1 L for left hand detection or the sensor 1 R for right hand detection; however, it is obvious that the present invention is not limited to this, but can be applied to a group of key having other functions and, also, it may well be applied to a single key in place of a group of keys.

Besides, the only one sensor for left hand detection or right hand detection may be provided, and in can be controlled to validate or invalidate, the group of keys arranged this side of the sensor, making them correspond to this single key.

The first effect of the present invention is that the user is not obliged to press the switching key, thereby saving one trouble, as the function of certain keys or a group of keys, by detecting the presence of hands at the home position on the keyboard.

The second effect of the present invention is that keys can be arranged in a portion that is usually used as palm rest and where, conventionally, keys were not arranged in order to avoid miss input by accidental press by the hand, because a key or a group of keys arranged in this side of the sensor is invalidated when a hand is in the proximity of the sensor.

What is claimed is:

1. A keyboard device, comprising:

a first group of keys provided on a keyboard;

a left hand sensor for detecting the presence of the left hand of a user at a left hand home position of said first group of keys;

a right hand sensor for detecting the presence of the right hand of a user at a right hand home position of said first group of keys;

a second group of keys provided on a left side of said first group of keys with said left hand sensor as a border;

a third group of keys provided on a right side of said first group of keys with said right hand sensor as a border; and a control section for monitoring the detection result of said left hand sensor and said right hand sensor and disabling the input by said second group of keys while said left hand sensor detects the left hand and disabling the input by said third group of keys while said right hand sensor detect the right hand.

2. A keyboard device as claimed in claim 1, wherein said second or third group of keys are group of numeric input keys.

3. A keyboard device as claimed in claim 2, wherein said second or third group of keys are group of cursor shift keys.

* * * * *